(12) United States Patent
Zubaj

(10) Patent No.: US 11,933,465 B2
(45) Date of Patent: Mar. 19, 2024

(54) LIGHTING DEVICE FOR VEHICLE HEADLAMPS

(71) Applicant: ZKW Group GmbH, Wieselburg (AT)

(72) Inventor: Andrej Zubaj, Krnca (SK)

(73) Assignee: ZKW Group GmbH, Wieselburg (AT)

( * ) Notice: Subject to any disclaimer, the term of this patent is extended or adjusted under 35 U.S.C. 154(b) by 71 days.

(21) Appl. No.: 17/613,695

(22) PCT Filed: May 29, 2020

(86) PCT No.: PCT/EP2020/065057
§ 371 (c)(1),
(2) Date: Nov. 23, 2021

(87) PCT Pub. No.: WO2020/245060
PCT Pub. Date: Dec. 10, 2020

(65) Prior Publication Data
US 2022/0228719 A1    Jul. 21, 2022

(30) Foreign Application Priority Data
Jun. 4, 2019 (EP) .................................. 19178169

(51) Int. Cl.
*F21S 41/29* (2018.01)
*F21S 41/24* (2018.01)
(Continued)

(52) U.S. Cl.
CPC .............. *F21S 41/24* (2018.01); *F21S 41/29* (2018.01); *G02B 6/0001* (2013.01); *F21W 2107/10* (2018.01)

(58) Field of Classification Search
CPC .......... F21S 41/24; F21S 43/237; F21S 41/29; F21S 43/27; F21S 43/14; F21S 41/141;
(Continued)

(56) References Cited

U.S. PATENT DOCUMENTS

2004/0041984 A1* 3/2004 Tani ..................... G03B 27/54
                                                353/20
2008/0151547 A1   6/2008 Grotsch et al.
(Continued)

FOREIGN PATENT DOCUMENTS

| CN | 104110653 A | * 10/2014 |
|---|---|---|
| KR | 20180077495 A | 7/2018 |
| WO | 2012059852 A1 | 5/2012 |

OTHER PUBLICATIONS

Search English translation of CN 104110653 A (Year: 2014).*
(Continued)

*Primary Examiner* — Omar Rojas Cadima
(74) *Attorney, Agent, or Firm* — Eversheds Sutherland (US) LLP

(57) ABSTRACT

A lighting device (10) for vehicle headlamps, comprising: —at least one light source (50), —a light guide (200) comprising an end section (210) with a light entry surface, —a light guide adapter (300) configured to secure the end section (210) and to hold the light entry surface in a position with regard to the light source (50), the light guide adapter (300) comprises a base-section (310) and a securing-section (320), and —a support frame (400), on which the light guide adapter (300) is mounted, wherein the securing-section (320) comprises a first engaging-element (320a), the base-section (310) comprises a first fastening-opening (311), the support frame (400) comprises a mounting-opening (410) for the securing-section (320) of the light guide adapter (300) and a second fastening-opening (411), wherein the mounting-opening (410) having a second engaging-element (410a) corresponding to the first engaging-element (320a), wherein the light guide adapter (300) can be brought into an end position (P2) by inserting the securing-section (320) into the mounting-opening (410), such that the first engaging-element (320a) engages with the second engaging-element
(Continued)

Figure 1A:
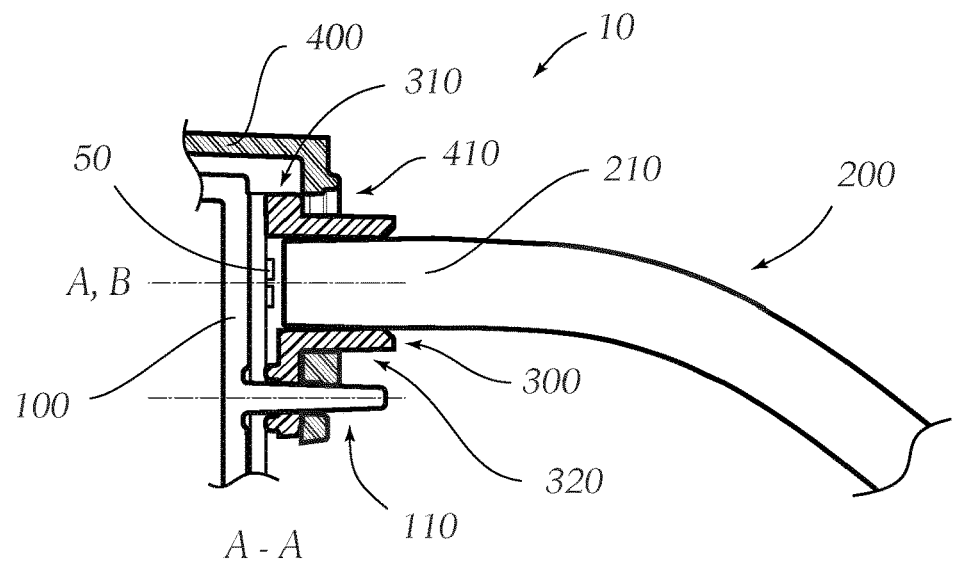

(410*a*), wherein the first fastening-opening (311) and the second fastening-opening (411) are overlapped, so that the first and second fastening-opening (311, 411) can receive a fastening-element (110).

13 Claims, 3 Drawing Sheets

(51) Int. Cl.
*F21V 8/00* (2006.01)
*F21W 107/10* (2018.01)

(58) Field of Classification Search
CPC ...... F21S 43/249; F21V 17/104; F21V 17/18; F21W 2107/10; B60Q 1/04; B60Q 1/0011; B60Q 1/0052; G02B 6/0006; G02B 6/4298
See application file for complete search history.

(56) References Cited

U.S. PATENT DOCUMENTS

| | | |
|---|---|---|
| 2011/0122617 A1 | 5/2011 | Frey et al. |
| 2017/0261168 A1 | 9/2017 | Edletzberger et al. |

OTHER PUBLICATIONS

International Search Report for PCT/EP2020/065057 dated Nov. 27, 2020 (14 pages).
Search Report for European Patent Application No. 19178169.9 dated Nov. 15, 2019 (8 pages).

\* cited by examiner

LIGHTING DEVICE FOR VEHICLE HEADLAMPS

The invention relates to a lighting device for vehicle headlamps, comprising:
at least one light source,
a light guide comprising an end section with a light entry surface, wherein the light guide is assigned to the at least one light source for guiding light which is emitted by the at least one light source and coupled into the light guide at the light entry surface,
a light guide adapter configured to secure the end section of the light guide and to hold the light entry surface in a position with regard to the at least one light source, the light guide adapter comprises a base-section and a securing-section, and
a support frame, on which the light guide adapter is mounted.

Further, the invention relates to a vehicle headlamp comprising at least one lighting device according to the invention.

Further, the invention relates to a method for assembling of a lighting device.

In the state of the art, the light guide is secured in conventionally assemblies by screw connections or clamping with use of additional parts. This leads to a significant effort with regard to the securing of the light guide and centring in a desired position.

It is an object of the invention to provide an enhanced lighting device.

To achieve this object, the securing-section of the light guide adapter comprises at least one first engaging-element, the base-section comprises at least one first fastening-opening,
the support frame comprises a mounting-opening for the securing-section of the light guide adapter and a second fastening-opening, wherein the mounting-opening having at least one second engaging-element corresponding to the at least one first engaging-element of the securing-section,
wherein the light guide adapter can be brought into an end position by inserting the securing-section into the mounting-opening, such that the at least one first engaging-element engages with the at least one second engaging-element, wherein the at least one first fastening-opening of the light guide adapter and the at least one second fastening-opening of the support frame are overlapped, so that the first and second fastening-opening can receive a fastening-element.

As a result of this solution, a reliable locking and centring system for the light guide on the support frame of the lighting device is provided, which ensures an accurate positioning in relation to the support frame and thus the light source.

The light guide adapter on the one side protects the at least one light source from damage and also provides a defined distance between the at least one light source and the light entry surface of the light guide.

Advantageously, the at least one first engaging-element of the light guide adapter is built as first locking-element protruding transversely to a longitudinal axis of the securing-section, wherein the at least one second engaging-element of the mounting opening is built as a recess corresponding to the at least one first locking-element,
and wherein the light guide adapter can be brought into an intermediate position by inserting the securing-section into the mounting-opening, such that the at least one first locking-element passes through the at least one recess and the base-section abuts on a portion of the support frame, which surrounds the mounting-opening, and wherein the light guide adapter can be brought into an end position by rotating the light guide adapter starting from the intermediate position around the longitudinal axis of the securing-section, such that the at least one first fastening-opening and the at least one second fastening-opening are overlapped, so that the first and second fastening-opening can receive a fastening-element.

Advantageously, the lighting device comprises a heat sink configured to dissipate the heat of the at least one light source, wherein the at least one light source is in thermal contact with the heat sink.

Advantageously, the heat sink comprises at least one fastening-element.

Advantageously, the at least one fastening-element is built as a pin protruding from the heat sink, which at least one pin is assigned to the at least one first and second fastening-opening, wherein the pin is insertable into the at least one first and second fastening-opening when the light guide adapter is in the end position.

Advantageously, the at least one first engaging-element is built as first latching-element, wherein the at least one second engaging-element is built as a counter latching-element.

Advantageously, the end section of the light guide comprises at least one second locking-element protruding transversely to a longitudinal axis of the end section, and wherein the end section is attachable to the securing-section of the light guide adapter and is lockable therein by means of the at least one second locking-element.

Advantageously, the securing-section of the light guide adapter comprises at least one recess with an abutment-portion corresponding to the at least one second locking-element of the end section of the light guide, wherein the at least one recess is configured to receive the at least one second locking-element, and wherein the end section is rotatable around the longitudinal axis or the light guide adapter is rotatable when the at least one second locking-element is received in the at least one recess of the securing section, such that the at least one second locking-element abuts on the abutment-portion of the at least one recess.

The abovementioned locking-mechanism or securing-mechanism can be a bayonet-locking mechanism.

Advantageously, the securing-section comprises two recesses with an abutment-portion, wherein the end section of the light guide comprises two corresponding second locking-elements.

Advantageously, the securing-section covers the end section of the light guide at least partly.

Advantageously, the inner surface of the securing-section, which surface covers the end section of the light guide, is metalized.

Thus, the effectivity in reflections at the end section of the light guide is increased.

At the same time, the insertion of the end section of the light guide into the securing-section of the light guide adapter leads to a shielding of the light feed externally.

The object of the invention is also be achieved by a method for assembling of a lighting device, comprising the following steps in chronological order:
a) providing
at least one light source,
a light guide comprising an end section with a light entry surface, wherein the light guide is assigned to the at least one light source for guiding light which is emitted by the at least one light source and coupled into the light guide at the light entry surface, a light guide adapter configured to secure the end section of the light guide and to hold the light entry surface in a final target position with regard to a support frame, the light guide adapter comprises a base-section and a securing-section, wherein the securing-section of the light guide adapter comprises at least one first engaging-element, the base-section comprises at least one first fastening-opening, a support frame, on which the light guide adapter is mounted, wherein the support frame comprises a mounting-opening for the securing-section and a second fastening-opening, wherein the mounting-opening having at least one second engaging-element corresponding to the at least one first engaging-element of the securing-section, b) positioning the light guide in the final target position with regard to the support frame, c) inserting the light guide adapter into the mounting-opening of the support frame, d) bringing the light guide adapter into an end position, such that the at least one first engaging-element engages with the at least one second engaging-element, wherein the at least one first fastening-opening and the at least one second fastening-opening are overlapped, so that the first and second fastening-opening can receive a fastening-element, wherein the light guide adapter secure the end section of the light guide in the final target position, e) inserting the fastening-element into the first and second fastening-opening.

Advantageously, the at least one first engaging-element is built as first locking-element protruding transversely to a longitudinal axis of the securing-section, wherein the at least one second engaging-element is built as a recess corresponding to the at least one first locking-element, and wherein the light guide adapter can be brought into an intermediate position by inserting the securing-section into the mounting-opening of the support frame, such that the at least one first locking-element passes through the at least one recess and the base-section abuts on a portion of the support frame, which surrounds the mounting-opening, and wherein the light guide adapter can be brought into an end position by rotating the light guide adapter starting from the intermediate position around the longitudinal axis of the securing-section, such that the at least one first fastening-opening and the at least one second fastening-opening are overlapped, so that the first and second fastening-opening can receive a fastening-element.

Advantageously, the end section of the light guide comprises at least one second locking-element protruding transversely to a longitudinal axis of the end section, and wherein the end section is attachable to the securing-section of the light guide adapter and is lockable by means of the at least one second locking-element, and wherein preferably the securing-section of the light guide adapter comprises at least one recess with an abutment-portion corresponding to the at least one second locking-element of the end section of the light guide, wherein the at least one recess of the securing section is configured to receive the at least one second locking-element of the light guide, and wherein the end section is rotatable around the longitudinal axis or the light guide adapter is rotatable, when the at least one second locking-element is received in the at least one recess, such that the at least one second locking-element abuts on the abutment-portion of the at least one recess.

Advantageously, in step d) the light guide adapter is rotated around the longitudinal axis of the securing-section, in order to bring the light guide adapter into the end position and to secure the end section of the light guide in the final target position with regard to the support frame.

This is particularly advantageous, if the light guide has a form or design, which does not allow a rotation, when the light guide adapter is in the desired final target position in a headlamp-housing or support frame, so that it is crucial to secure or fixate the end section of the light guide with regard to the support frame or the at least one light source with a light guide adapter.

Figure 1B:
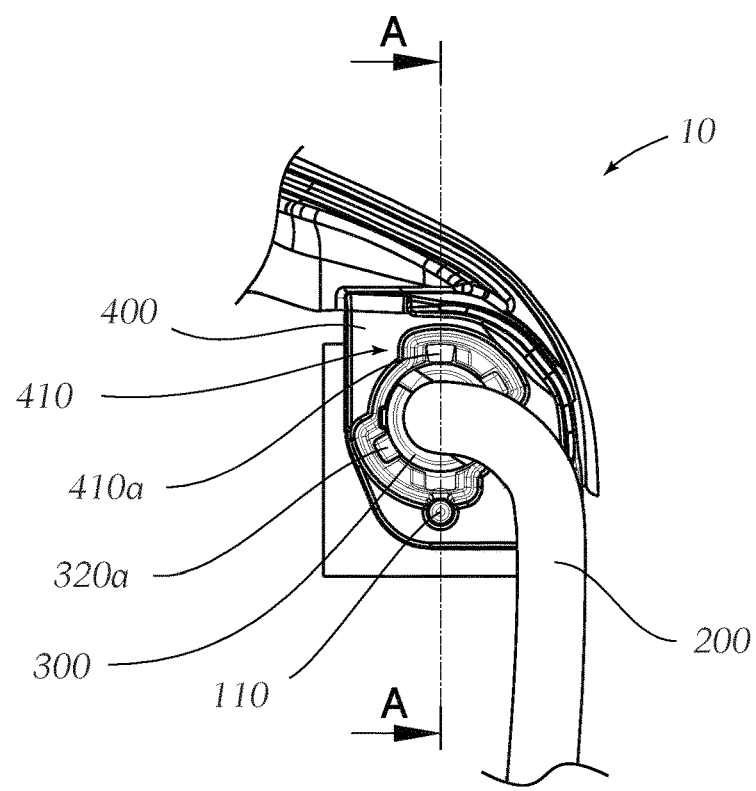
Figures 2A, 2B:
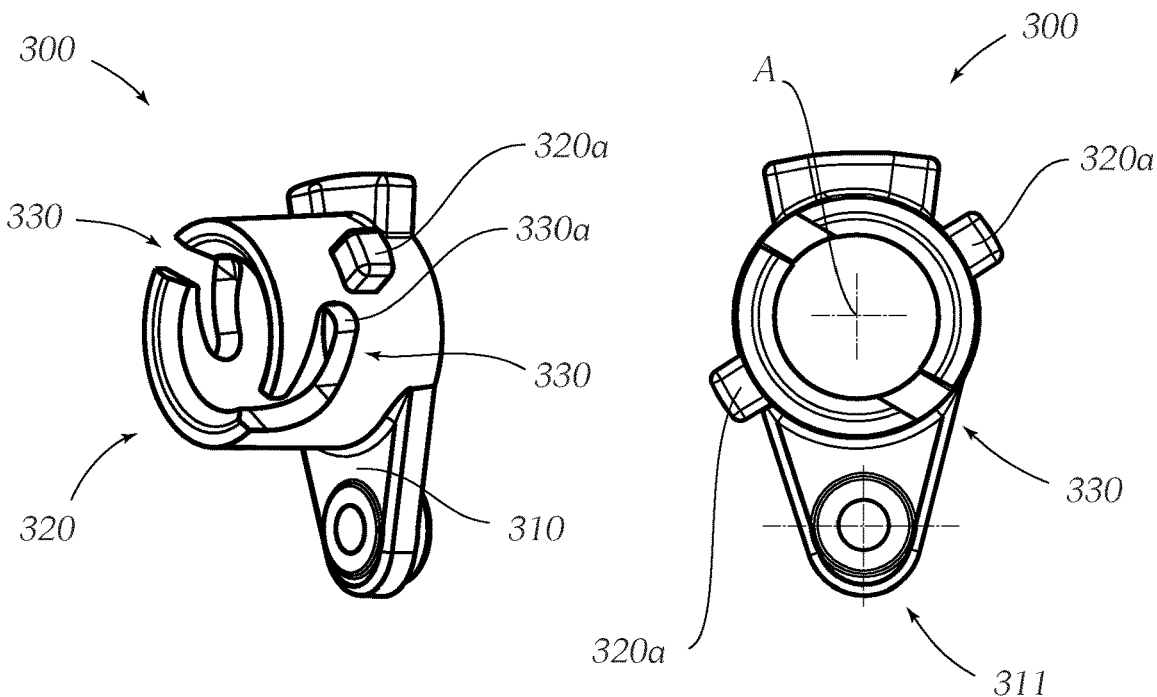
Figure 3:
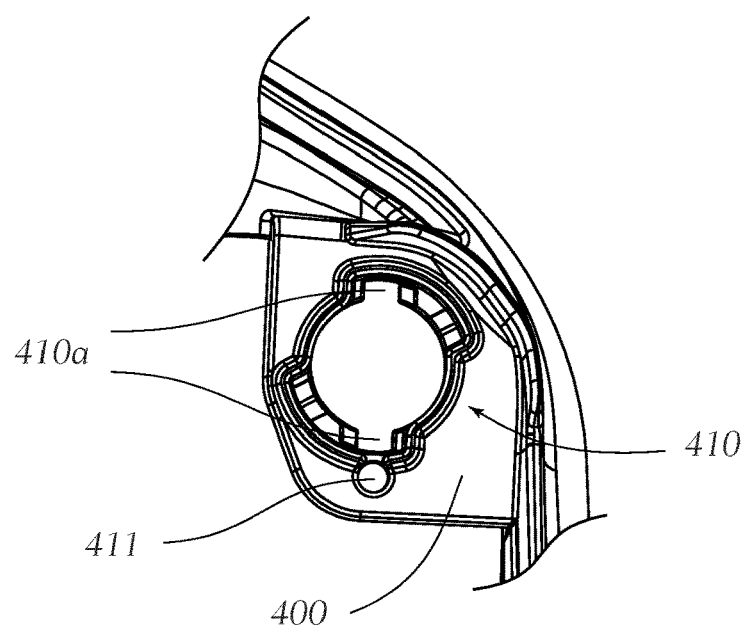
Figure 4A:
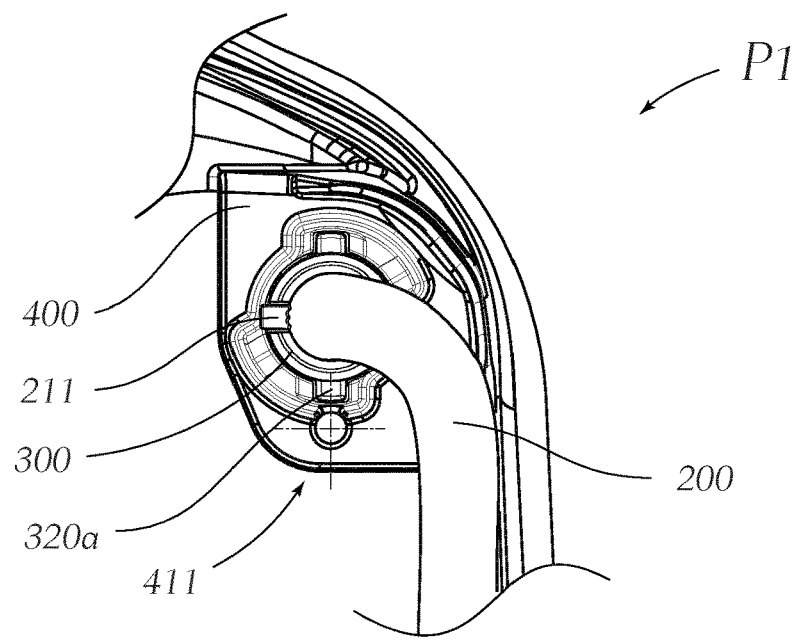
Figure 4B:
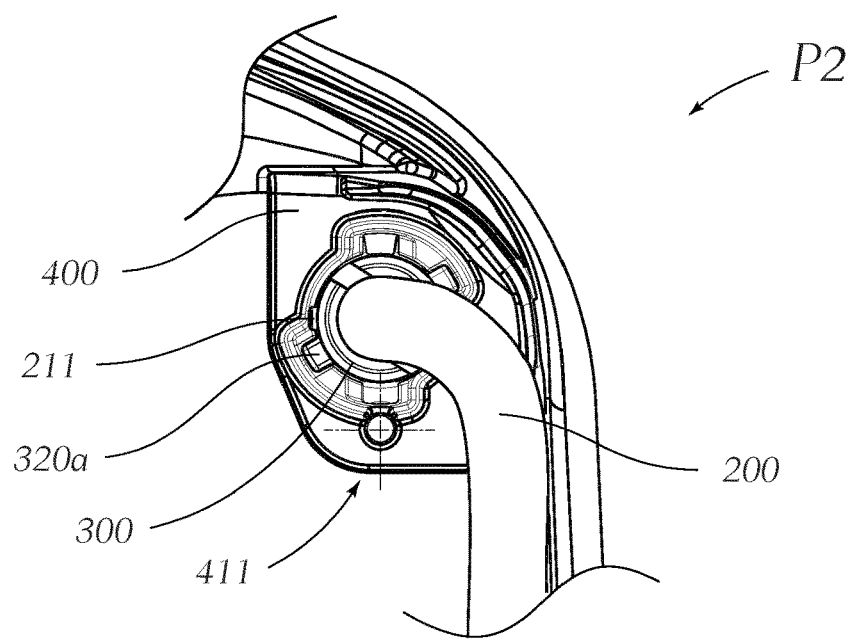

In the following, in order to further demonstrate the present invention, illustrative and non-restrictive embodiments are discussed, as shown in the drawings, which show:

FIG. 1A a side view of an example of a lighting device with light sources, a light guide secured in a light guide adapter, where the light guide adapter is inserted in a mounting opening of a support frame, FIG. 1B a perspective view of the lighting device of FIG. 1A, FIG. 2A a detailed perspective view of the light guide adapter, FIG. 2B a detailed front view of the light guide adapter, FIG. 3 a detailed view of the support frame and the mounting opening, FIG. 4A an intermediate position of the light guide adapter in the mounting opening of the support frame, and FIG. 4B an end position of the light guide adapter in the mounting opening of the support frame.

FIG. 1A and FIG. 1B show a lighting device 10 for vehicle headlamps in a side view, wherein the lighting device 10 comprises light sources 50, a light guide 200 having an end section 210 with a light entry surface, wherein the light guide 200 is assigned to the light sources 50 for guiding light which is emitted by the light sources 50 and coupled into the light guide 200 at the light entry surface. The lighting device 10 comprises a heat sink 100 configured to dissipate the heat of the light sources 50, wherein the at least one light source 50 is in thermal contact with the heat sink 100, wherein the heatsink 100 comprises a fastening-element 110.

Further, the lighting device 10 comprises a light guide adapter 300 configured to secure the end section 210 of the light guide 200 and to hold the light entry surface in a position with regard to the at least one light source 50, the light guide adapter 300 comprises a base-section 310 and a securing-section 320, which can be seen in more detail in FIG. 2A, and wherein the light guide adapter 300 is mounted on a support frame 400.

FIG. 2A and FIG. 2B show a more detailed view of the light guide adapter 300 itself, wherein the securing-section 320 of the light guide adapter 300 comprises two first engaging-elements 320a, which are built as first locking-elements protruding transversely to a longitudinal axis A of the securing-section 320, the base-section 310 comprises one first fastening-opening 311.

FIG. 3 shows a detailed view of the support frame 400, wherein the support frame 400 comprises a mounting-opening 410 for the securing-section 320 and a second fastening-opening 411, wherein the mounting-opening 410 having two second engaging-elements 410a, which are built as recesses corresponding to the two first locking-elements 320a of the securing-section 320.

Referring to FIG. 4A (intermediate position P1), the light guide adapter 300 can be brought into an intermediate position P1 by inserting the securing-section 320 into the mounting-opening 410, such that the two first locking-elements 320a passes through the two recesses 410a and the base-section 310 of the light guide adapter 300 abuts on a portion of the support frame 400, which surrounds the mounting-opening 410.

Referring to FIG. 4B, the light guide adapter 300 can be brought into an end position P2 by rotating the light guide adapter 300 starting from the intermediate position P1 (shown in FIG. 4A) around the longitudinal axis A of the securing-section 320, such that the first fastening-opening 311 of the light guide adapter 300 and the second fastening-opening 411 of the support frame 400 are overlapped, so that the first and second fastening-opening 311, 411 can receive the fastening-element 110 of the heatsink 100, wherein the fastening-element 110 is built as a pin protruding from the heat sink 100, the pin is assigned to the first and second fastening-opening 311, 411, and wherein the pin is insertable into the first and second fastening-opening 311, 411 when the light guide adapter 300 is in the end position P2.

For securing the end section 210 of the light guide 200 in the securing-section 320 of the light guide adapter 300, the end section 210 comprises two second locking-elements 211 protruding transversely to a longitudinal axis B of the end section 210, and wherein the securing-section 320 comprises two recesses 330 with an abutment-portion 330a corresponding to the two second locking-elements 211 of the end section 210 of the light guide 200. The two recesses 330 are configured to receive the two second locking-elements 211, and wherein the end section 210 is rotatable around the longitudinal axis B when the two second locking-elements 211 are received in the recesses 330, such that two second locking-elements 211 abut on the abutment-portions 330a of recesses 330. The abovementioned locking-mechanism or securing-mechanism is substantially a bayonet-locking mechanism.

Further, the securing-section 320 covers the end section 210 of the light guide 200 at least partly, when the end section 210 is secured in the securing-section 320, wherein the inner surface of the securing-section 320, which surface covers the end section 210 of the light guide 200, is metalized.

LIST OF REFERENCE SIGNS

Lighting device . . . 10
Light source . . . 50
Heat sink . . . 100
Fastening-element . . . 110
Light guide . . . 200
End section . . . 210
Second locking-element . . . 211
Light guide adapter . . . 300
Base-section . . . 310
First fastening-opening . . . 311
Securing-section . . . 320
First engaging-element . . . 320a
Recess of the securing section . . . 330
Abutment-portion of the recess . . . 330a
Support frame . . . 400
Mounting-opening . . . 410
Second engaging-element . . . 410a
Second fastening-opening . . . 411
Intermediate position . . . P1
End position . . . P2
Longitudinal axis (adapter) . . . A
Longitudinal axis (end section) . . . B

The invention claimed is:

1. A lighting device (10) for vehicle headlamps, comprising:
  at least one light source (50);
  a light guide (200) comprising an end section (210) with a light entry surface, wherein the light guide (200) is assigned to the at least one light source (50) for guiding light which is emitted by the at least one light source (50) and coupled into the light guide (200) at the light entry surface;
  a light guide adapter (300) configured to secure the end section (210) of the light guide (200) and to hold the light entry surface in a position with regard to the at least one light source (50), wherein the light guide adapter (300) comprises a base-section (310) and a securing-section (320); and
  a support frame (400), on which the light guide adapter (300) is mounted,
  wherein the securing-section (320) of the light guide adapter (300) comprises at least one first engaging-element (320a), wherein the base-section (310) comprises at least one first fastening-opening (311),
  wherein the support frame (400) comprises a mounting-opening (410) for the securing-section (320) and a support frame fastening-opening (411), wherein the mounting-opening (410) has at least one support frame engaging-element (410a) corresponding to the at least one first engaging-element (320a) of the securing-section (320), and
  wherein the light guide adapter (300) is configured to be brought into an end position by inserting the securing-section (320) into the mounting-opening (410), such that the at least one first engaging-element (320a) engages with the at least one support frame engaging-element (410a), wherein the at least one first fastening-opening (311) and the support frame fastening-opening (411) are overlapped, so that the at least one first fastening-opening (311) and the support frame fastening-opening (411) receives a fastening-element (110),
  wherein the at least one first engaging-element (320a) is built as a first locking-element protruding transversely to a longitudinal axis (A) of the securing-section (320), wherein the at least one support frame engaging-element (410a) is built as a recess corresponding to the at least one first locking-element,
  wherein the light guide adapter (300) is configured to be brought into an intermediate position (P1) by inserting the securing-section (320) into the mounting-opening (410), such that the first locking-element passes through the recess (410a) and the base-section (310) abuts a portion of the support frame (400), which surrounds the mounting-opening (410), and
  wherein the light guide adapter (300) is configured to be brought into an end position (P2) by rotating the light guide adapter (300) starting from the intermediate position (P1) around the longitudinal axis (A) of the securing-section (320), such that the at least one first fastening-opening (311) and the support frame fastening-opening (411) are overlapped, and the fastening-element (110) is received through both the at least one first fastening-opening (311) and the support frame fastening-opening (411).

2. The lighting device according to claim 1, wherein the lighting device (10) comprises a heat sink (100) configured to dissipate the heat of the at least one light source (50), wherein the at least one light source (50) is in thermal contact with the heat sink (100).

3. The lighting device according to claim 2, wherein the heat sink (100) comprises the at least one fastening-element (110).

4. The lighting device according to claim 3, wherein the at least one fastening-element (110) is built as a pin protruding from the heat sink (100), which at least one pin is assigned to the at least one first fastening-opening (311) and the support frame fastening-opening (411), wherein the pin is insertable into the at least one first fastening-opening (311) and the support frame fastening-opening (411) when the light guide adapter (300) is in the end position (P2).

5. The lighting device according to claim 1, wherein the at least one first engaging-element (320a) is built as first latching-element, wherein the at least one support frame engaging-element (410a) is built as a counter latching-element.

6. The lighting device according to claim 1, wherein the end section (210) of the light guide (200) comprises at least one second locking-element (211) protruding transversely to a longitudinal axis (B) of the end section (210), and wherein the end section (210) is attachable to the securing-section (320) of the light guide adapter (300) and is lockable by means of the at least one second locking-element (211).

7. The lighting device according to claim 6, wherein the securing-section (320) of the light guide adapter (300) comprises at least one recess (330) with an abutment-portion (330a) corresponding to the at least one second locking-element (211) of the end section (210) of the light guide (200), wherein the at least one recess (330) is configured to receive the at least one second locking-element (211), and wherein the end section (210) is rotatable around the longitudinal axis (B) or the light guide adapter (300) is rotatable, when the at least one second locking-element (211) is received in the at least one recess (330), such that the at least one second locking-element (211) abuts the abutment-portion (330a) of the at least one recess (330).

8. The lighting device according to claim 1, wherein the securing-section (320) covers the end section (210) of the light guide (200) at least partly.

9. The lighting device according to claim 8, wherein the inner surface of the securing-section (320), which surface covers the end section (210) of the light guide (200), is metalized.

10. A vehicle headlamp comprising at least one lighting device according to claim 1.

11. A method for assembling a lighting device (10), comprising the following steps in chronological order:
a) providing
   at least one light source (50),
   a light guide (200) comprising an end section (210) with a light entry surface, wherein the light guide (200) is assigned to the at least one light source (50) for guiding light which is emitted by the at least one light source (50) and coupled into the light guide (200) at the light entry surface,
   a light guide adapter (300) configured to secure the end section (210) of the light guide (200) and to hold the light entry surface in a final target position with regard to a support frame (400), the light guide adapter (300) comprises a base-section (310) and a securing-section (320), wherein the securing-section (320) of the light guide adapter (300) comprises at least one first engaging-element (320a), the base-section (310) comprises at least one first fastening-opening (311), and
   a support frame (400), on which the light guide adapter (300) is mounted, wherein the support frame (400) comprises a mounting-opening (410) for the securing-section (320) and a support frame fastening-opening (411), wherein the mounting-opening (410) has at least one support frame engaging-element (410a) corresponding to the at least one first engaging-element (320a) of the securing-section (320);
b) positioning the light guide (200) in the final target position with regard to the support frame (400);
c) inserting the light guide adapter (300) into the mounting opening (410);
d) bringing the light guide adapter (300) into an end position (P2), such that the at least one first engaging-element (320a) engages with the at least one support frame engaging-element (410a), wherein the at least one first fastening-opening (311) and the support frame fastening-opening (411) are overlapped, so that the at least one first fastening-opening (311) and the support frame fastening-opening (411) receives a fastening-element (110), wherein the light guide adapter (300) secure the end section (210) of the light guide (200) in the final target position; and
e) inserting the fastening-element (110) into the at least one first fastening-opening (311) and the support frame fastening-opening (411), wherein the at least one first engaging-element (320a) is built as first locking-element protruding transversely to a longitudinal axis (A) of the securing-section (320), wherein the at least one support frame engaging-element (410a) is built as a recess corresponding to the at least one first locking-element,
wherein the light guide adapter (300) can be brought into an intermediate position (P1) by inserting the securing-section (320) into the mounting-opening (410), such that the first locking-element (320a) passes through the recess (410a) and the base-section (310) abuts a portion of the support frame (400), which surrounds the mounting-opening (410), and
wherein the light guide adapter (300) can be brought into an end position (P2) by rotating the light guide adapter (300) starting from the intermediate position (P1) around the longitudinal axis (A) of the securing-section (320), such that the at least one first fastening-opening (311) and the at least one second fastening-opening (411) are overlapped, and the fastening-element (110) is received through both the at least one first fastening-opening (311) and the support frame fastening-opening (411).

12. The method according to claim 11, wherein the end section (210) of the light guide (200) comprises at least one second locking-element (211) protruding transversely to a longitudinal axis (B) of the end section (210), and wherein the end section (210) is attachable to the securing-section (320) of the light guide adapter (300) and is lockable by means of the at least one second locking-element (211), and wherein the securing-section (320) of the light guide adapter (300) comprises at least one recess (330) with an abutment-portion (330a) corresponding to the at least one second locking-element (211) of the end section (210) of the light guide (200), wherein the at least one recess (330) is configured to receive the at least one second locking-element (211), and wherein the end section (210) is rotatable around the longitudinal axis (B) or the light guide adapter (300) is rotatable, when the at least one second locking-element (211) is received in the at least one recess (330), such that the at least one second locking-element (211) abuts the abutment-portion (330*a*) of the at least one recess (330).

13. The method according to claim 12, wherein the light guide adapter (300) is rotated around the longitudinal axis (A) of the securing-section (320), in order to bring the light guide adapter (300) into the end position (P2) and to secure the end section (210) of the light guide (200) in the final target position with regard to the support frame (400).

\* \* \* \* \*